FIG. I.

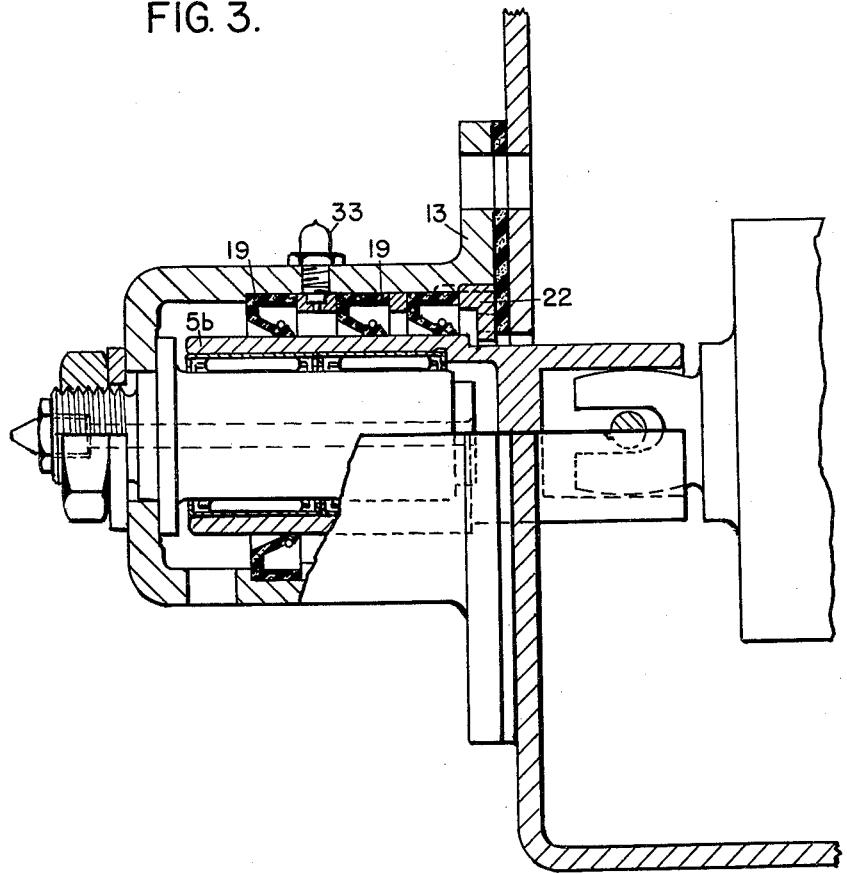

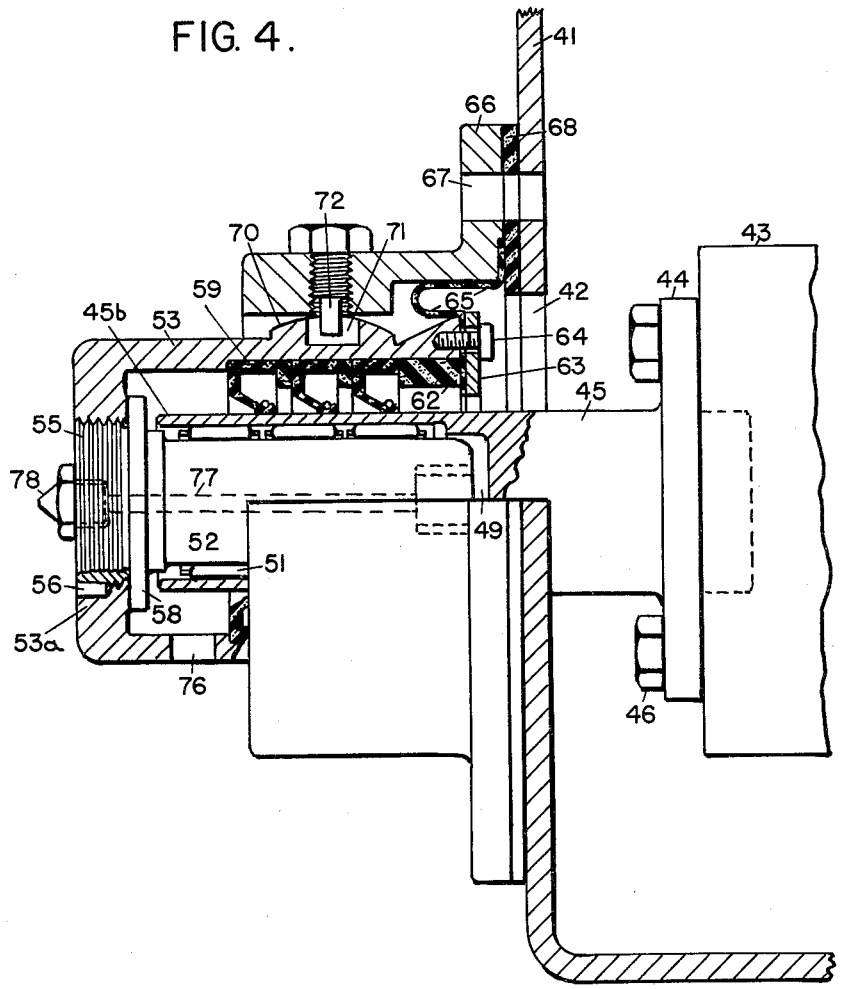

United States Patent Office 3,068,051
Patented Dec. 11, 1962

3,068,051
BEARINGS FOR ROLLERS IN TROUGHS OR TANKS CONTAINING LIQUID
Franz Koch, Provinostrasse 52, Augsbury, Germany
Filed Aug. 8, 1960, Ser. No. 48,284
20 Claims. (Cl. 308—187.1)

The invention relates to the mounting in bearings of rollers in troughs or tanks containing liquid.

In their passage through tanks of this nature textile fabrics and similar goods are subjected to the action of liquid which may contain, for example, dye stuffs, but which also, and not infrequently do contain highly reactive chemical agents. Such troughs or tanks are in common use particularly for textile furnishing processes.

The mounting of the rollers, i.e. of those rollers serving to conduct the fabric, or whatever the material may be, through the liquid—generally referred to as guide or conductor rollers—presents very considerable problems in actual practice.

So-called "block" or "plug" bearings have long been known as the principal means of mounting rollers in a tank containing liquid, these being mounted in the sides of the tank; this type of bearing consists of a sort of cubical plug, suitably bored to take the shaft end. Such "plug" bearings may be of various types of materials, thus for example, carbon, Bakelite, lignum vitae, gunmetal are applicable.

In addition to a relatively high incidence of friction, however, this type of bearing presents certain other disadvantages which limit their adoption in actual practice. Experience shows that there is comparatively rapid wear of the bore of the bearing, resulting in the rollers starting to run out of true and so "smocking." Also the action of the chemicals, as for instance, acids, contained in the liquid is conducive to corrosion. The effective life of this type of bearing can be taken as only about six to eight weeks, so that frequent replacement is called for. Replacement is, of itself, a complicated business: moreover, if replacement at the right time happens to get overlooked, misalignment of the rollers ensues, and the resultant deviation from the horizontal seriously affects the passage of the fabric, causing it to drift sideways and to form creases.

A second well-known design of bearing provides for the shaft end of the roller to be taken through a cut-out in the side of the tank, a ball, roller or needle bearing being mounted on the outer face of the tank side, the shaft end being carried by, and running in, this bearing. The bearing itself, i.e. the balls, rollers or needles etc. is mounted on the shaft end on the outer face of the tank wall or side, being held in position by an outer ring or container. A seal of some kind is provided between the bearing and the tank side.

There are, however, certain quite significant drawbacks inherent in this type of bearing too. The fitting of the bearing in the first place is a difficult matter: replacement is a long and far from simple job. Experience has revealed one particularly unfortunate drawback in the use of bearings of this type, namely that they do not sufficiently meet all the stringent requirements of providing an effective seal. Actual practice has shown that it is impossible to ensure that absolutely no liquid whatever penetrates into the inside of the bearing and thus damage to the bearing results after a comparatively short time running. Not infrequently, too, these sealing rings get out of centre one to the other, due, among other reasons, to the impossibility of accurately fitting these seals in the first place.

Both the above-mentioned arrangements have the following disadvantages in common: the shaft end, that is to say, the stub shaft of the roller, is firmly fixed to the roller itself, and whilst in actual practice it may be possible when initially mounting the rollers to ensure that the two bearings on the opposing sides of the tank are aligned, it is impossible to maintain this alignment under working conditions, firstly because of the natural, resilient, deformation of the tank walls under the varying pressures exerted by the movement of the liquid inside the tank allied to the force exerted by the roller itself, and secondly by reason of the alteration from the original position of the bearings resulting, for example, from wear in the seals. Once these bearings have to be replaced, it is more or less impossible to get the bearings accurately aligned again. Further, distortion of the rollers, or more correctly, of the roller shaft ends, frequently occurs—this applying equally to both heavy and light rollers—causing further misalignment of the bearings.

Thus the problem to which the present invention has to provide a satisfactory solution is (1) to ensure that the bearing is absolute proof against the leakage of liquid from the tank, and, at the same time (2) to nullify those influences which give rise to misalignment of the bearings.

The invention provides the solution to (1) by the shaft end of the roller being hollowed out over its extremity, the integral parts of the bearing being accommodated within the more or less cylindrical, and, as it were, "blind-bored" space or hollow so formed, whilst the sealing arrangement and its components is disposed around, and enclosing, the outer face of a cover to the roller shaft end.

The solution to (2) is achieved by the provision of a Cardan joint which can be applied in a variety of ways as described hereafter.

The application of both these features combined is to be preferred, as presenting the greatest advantage.

The innermost portion of the bearing, thus, for instance, a gudgeon or an inner bearing ring, is attached, at the outer side of the opening for the shaft end, either rigidly or with provision for adjustment, to a cover, or cap, such cover or cap in turn being fixed either rigidly or with a resilient seal, to the outer face of the tank wall, with or without the interposition of sealing discs as required.

The liquid which, even in the case of the most efficient seals, cannot be entirely prevented from seeping through the seal is trapped in the cap, thus rendering impossible penetration into the bearing: this liquid is conducted away through a hole or a channel along the bottom of the cap.

In those cases where the shaft end is firmly attached to the roller, the Cardan joint can be so devised that the cap of the bearing is either suspended in, or is carried in, some component attached to the tank wall, e.g. a flange ring, in the style of a universal joint.

In all cases care is taken to ensure that the inner, "blind-bore," recess of the stub shaft, the opening of which faces outwards, is closed at the end facing the inside of the tank either by a division wall or by some similar means.

The invention will now be described further, by way of example only, with reference to the accompanying drawings in which:

FIG. 3 shows a bearing as illustrated in FIG. 1 but with additional provision for lubrication; and FIG. 4 is a cross-section of a bearing with Cardan suspension to the whole bearing, the stub shaft being firmly attached to the roller.

Figure 1:
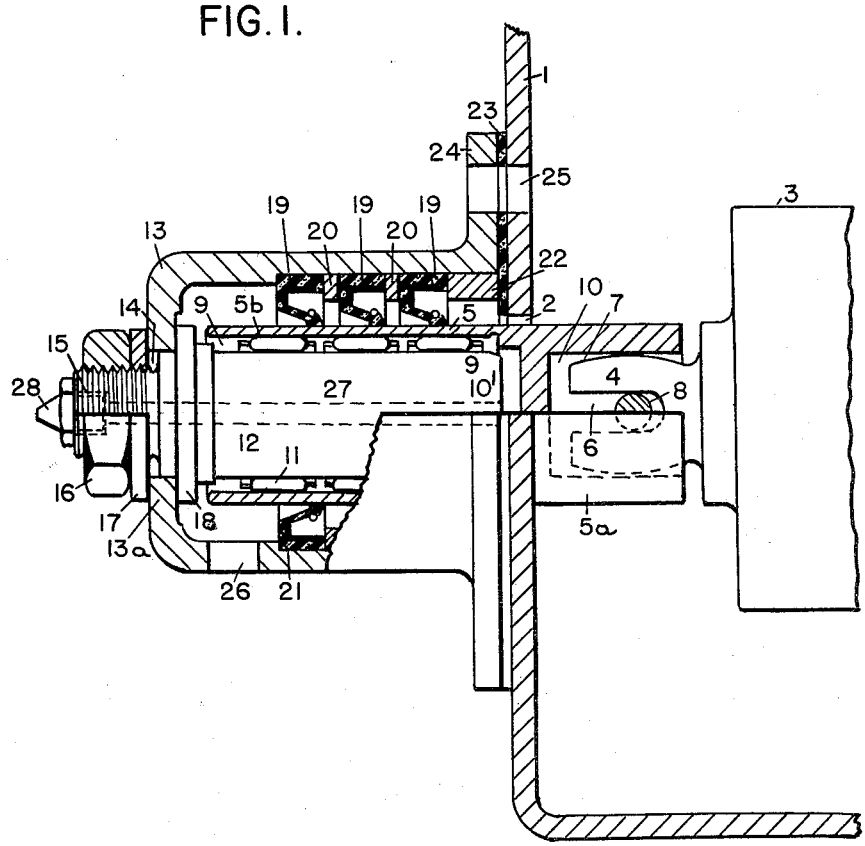
FIG. 1 shows a cross-section of a bearing having a Cardan joint between the roller and the stub shaft, the latter being separate from the roller.
Figure 2:
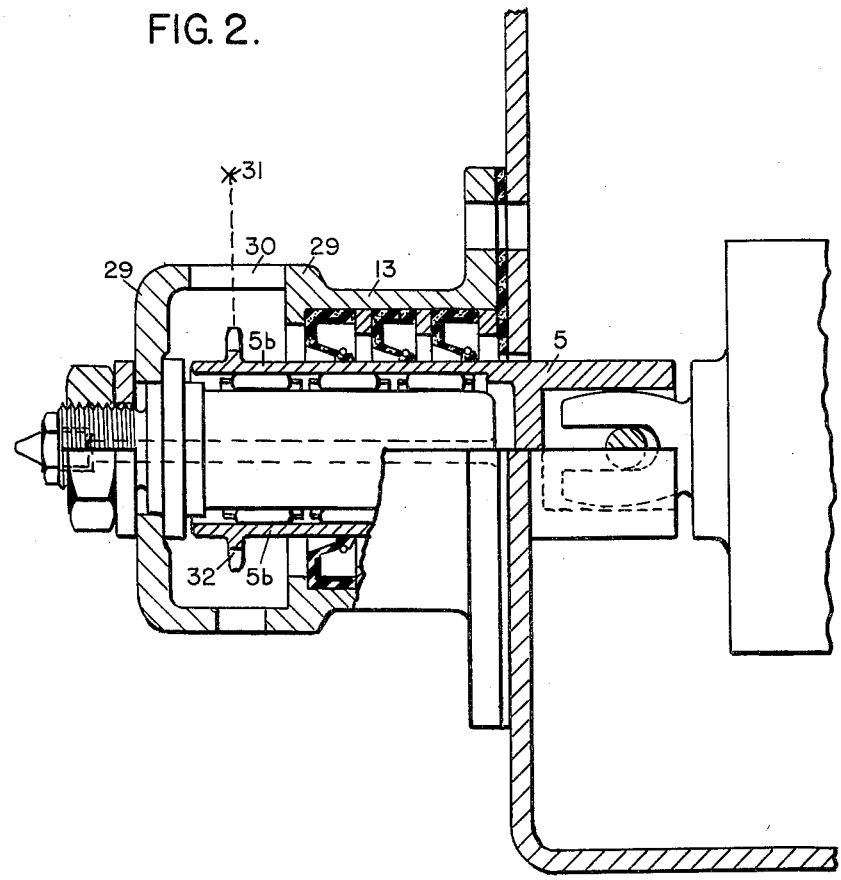
FIG. 2 shows a bearing as illustrated in FIG. 1 but with provision for drive.

In the examples as FIGS. 1–3, the roller itself is independent of the stub shaft projecting through the side of the tank, a Cardan joint being disposed, inside the tank, between the roller and the stub shaft.

The embodiment illustrated in FIG. 1 shows the tank side 1 with bore or cut-out at 2. The roller 3, inside the tank, is provided with a stub 4, this forming one part of a Cardan joint, the main portion of which is the portion marked 5a i.e. the inner extent of the cylindrical shaft end 5. An effective Cardan joint is provided by the roller stub being made fork-shaped with cross-slit 6, the outer face 7 of this fork being radiused. A crosspeg 8 of suitable dimension is disposed diametrically of that portion marked 5a, and is adapted to engage the cross-slit 6. The stub shaft 5 projects outwards from the tank through the cut-out 2, that portion of the stub shaft marked 5b being mounted in a manner yet to be described. The blind-bored inner recess 9 of the portion 5b is separated from the recess 10 of the inner portion 5a by a division wall $10^1$ through which it is impossible for any liquid to pass. In the recess 9 will be seen the bearing on which the unit revolves and in this case the bearing consists of a needle bearing 11, the outer ring of said bearing being formed by the inner wall of portion 5b (or it can be inserted in space 9 as an individual component), the inner ring or inner portion being formed by the cylindrical stub axle 12. In this arrangement, therefore, the needles of the needle bearing 11 run on and in contact with the inner face of the portion 5b and the outer face of the stub axle 12. The cylindrical plug 12 is fixed to the bearing cap 13, said bearing cap 13 being bell shaped. In the present embodiment the method of attachment between the stub axle 12 and bearing cap 13 is as follows: the front wall 13a of the bearing cap 13 is bored in the centre 14, and through this hole extends a screw-threaded portion or length 15 of the stub axle 12: portion 15 is held firmly in place by a nut 16, a washer 17 located between said nut and the end face of the bearing cap, and at the same time a suitably dimensioned annular collar 18 formed on the axle 12 is brought into abutment with the inner face of portion 13a.

As shown by FIG. 1 the entire bearing is thus disposed inside the stub shaft 5. Around the outer face of this stub shaft, viz. at that portion marked 5b, are disposed sealing rings 19, a number of these preferably being arranged one after the other with separating rings between each, the sealing rings 19 being preferably of the selfspringing type. The sealing rings 19 abut, on the one side, a recess 21 cut in the inner face of the cap 13, and, on the other, on to the outer face of portion 5b, forming a seal at this point. The rings 19 are thus held tight against the bearing cap 13, whilst the stub shaft 5 revolves round the seal rings 19 against the pressure of the sealing faces. A seal or setting ring 22 may be provided between this set of seal rings 19 (three such seal rings 19 are shown as an example in FIG. 1) and the tank wall 1. The ring 22, which may be of rubber, Bakelite or metal, presses hard up against an annular disc or washer 23, the washer being resilient or nonresilient as desired and being disposed between the flange 24 of the bearing cap 13 and the tank wall 1. Flange 24 is affixed to the tank wall 1 by the bolts 25 as shown in the diagram, or by some other easily detachable means.

A hole or some such suitable drain 26 is bored in the under side of the bearing cap 13, and can be fitted with a conduit or an outlet pipe.

The mode of operation is as follows: rotation of the roller 3, driven by means not shown, effects rotation of the stub shaft 5 by virtue of the Cardan joint 4, 6, 8, 5a and any displacement of the axis of roller 3 relative to the axis of the stub shaft 5 is compensated for by the Cardan joint. Thus alignment of the stub shaft 5 in its bearing is maintained. In actual practice it will be found impossible, despite the seal rings 19 and any other arrangement of seals, to prevent some, if only a very slight quantity, of the liquid in the tank seeping through to the outside. Whilst this small quantity of liquid will, upon seepage, flow into the inside of the bearing cap 13, the whole arrangement is such that it cannot possibly penetrate to the inner recess 9 in which the bearing is located, but will be drained off through the opening or hole 26. Any liquid seeping through from the tank is through outwards by the revolving stub shaft 5, impinges on the cylindrical inner wall of the cap 13 and then flows downwards and out through the outlet 26.

As shown in FIG. 1, the cylindrical stub axle 12 may have an axially directed through hole 27 bored therein, such through hole providing a means whereby a lubricant might be applied to the bearing. The hole 27 is normally sealed off by a screw plug 28, or some such arrangement, the plug preferably being in the form of a grease gun nipple in order that grease can be applied, under pressure, through the nipple to the inner recess 9 thence between the cylindrical stub axle 12 and the division wall $10^1$ and finally in the reverse direction into the needle bearing 11. Any excess lubricant is drained away through the outlet 26. If required, continuous lubrication with a constant feed can be provided: such an arrangement will, moreover, assist in preventing the penetration of liquid into the bearing.

In the embodiment shown in FIG. 2 the bearing cap 13 is increased in diameter at its outer extremity 29, so as to permit of the application of a driving arrangement. With this end in view part of the increased diameter portion 29 is cut away to form a cut-out 30, and through this cut-out a driving chain (not shown) running in the plane 31 engages a sprocket wheel 32, said wheel 32 being integral with or separate from the portion 5b of the stub shaft 5 as required.

The embodiment illustrated in FIG. 3 is similar to that of FIGS. 1 and 2 and only the essential reference numbers are given. The bearing cap 13 may be the same shape as, or of a similar shape to, that of FIG. 1, but is provided with a means of lubrication in its upper part, in the form of a lubricating nipple 33, or some such similar arrangement, effectively introduced in the region of the two sealing rings 19, This lubricating device is for the purpose of introducing grease to the faces of the seals between the seal rings 19 and portion 5b, with the object of reducing friction and improving the sealing effect.

In FIG. 3 the intermediate ring 22 is rather differently shaped, in this case being of L-shaped cross section in contradistinction to the rectangular section of FIGS. 1 and 2.

In FIG. 4 the wall of the tank 41 is provided with a cut-out 42. The stub shaft 45 is attached, by nuts and bolts, to roller 43 through the medium of the stub shaft flange 44: if required, of course, parts 43, 44 and 45 can be integral. An outer portion 45b of the stub shaft 45 projects through the opening 42 in the tank wall 41. The outer portion 45b is provided with a "blind-bored" axially directed inner recess 49 of suitable length. A needle bearing 51 is located in the recess 49, in a similar manner to that previously described, said needle bearing being supported and carried by the stub axle 52. The stub axle 52 is held in place by its outer, threaded, extremity 55 being screwed into a tapped hole 53a in the front of the bearing cap 53, the annular flange 58 of the stub axle 52 being brought into abutment with the inner surface of the end face of the bearing cap 53. The screw 56 shown in the drawing serves as a locking arrangement. Here again resilient seal rings 59 are introduced between the bearing cap 53 and section 45b: here too a distance, or separating ring 62 can be provided, in this case pressing on to an annular plate 63, partially covering the inner portion of the bearing cap 53 on the side facing the tank. The annular plate 63 is attached to the bearing cap 53 by a bolt 64.

In view of the flexibility of the bearing cap 53 called for in this case, a flexible annular seal 65, folded rather in the nature of a pair of bellows, is interposed, with its inner edge between the bearing cap 53 and the annular plate 63, its outer edge being held tightly between a bearing holder ring 66 and the tank wall 41. The ring 66 is affixed by means of bolts 67, a seal 68 being interposed, this seal being either of the non-resilient, resilient, or permanently plastic type.

The bearing carrying ring 66, carrying the rotating unit, is in the shape of an angled flange and a cylindrical portion 69 thereof forms a part of a Carden bearing between the components 66, 69 on the one hand and the bearing cap 53 on the other, the bearing cap being provided, for this purpose, with a radiused portion 70. The radiused portion 70 may be provided with a cutout or an opening 71, into which the end of a bolt 72 engages, with the requisite amount of play. This cut-out 71 may be in the form of a "blind bore" disposed radially, thereby also providing assurance against distortion, inasmuch as the bearing cap 53 is unable to twist, or at the most, can make only a very limited movement in relation to the cylindrical portion 69.

An outlet 76 is provided in the bearing cap 53 through which any liquid which may penetrate through the seals is drained away without penetrating the region of the bearing 51. A grease hole 77 is provide which may be capped on the outer end with a grease gun nipple.

In the case of FIG. 4 the whole arrangement is such that, whilst deviations of the roller 43 do, in fact, pass to the stub shaft and are consequently transmitted to all the parts within the bearing cap 53 and to the cap itself, this bearing cap 53 compensates any such deviation through the Cardan connection at portion 69.

I claim:

1. A bearing assembly for a roller used as a guide or conductor roller in a fluid-containing tank, said bearing assembly comprising, a stub shaft adapted to be operatively connected at one end to said roller, a recess in the end face of the shaft which is remote from said one end thereof, an axle fitting within said recess and having its axis generally parallel to said shaft, bearing means located within said recess and cooperating with the outer surface of said axle and the inner surface of said stub shaft within said recess, a bearing cap secured to said axle at the end remote from said recess, and sealing means disposed between the outer surface of said stub shaft and said bearing cap.

2. A bearing assembly as claimed in claim 1 in which said recess comprises a cylindrical blind hole directed axially of the shaft.

3. In a fluid-containing tank having a guide or conductor roller therein and a stub shaft which operatively connects to the roller and extends through an aperture defined in the wall of the tank, the combination with said tank and said roller and stub shaft of a bearing assembly comprising, a recess in the end face of the shaft which is remote from said one end thereof, an axle fitting within the recess and having its axis generally parallel to said shaft, bearing means located within said recess and cooperating with the outer surface of said axle and the inner surface of said stub shaft within said recess, a bearing cap secured to said axle at the end remote from said recess, and sealing means disposed between the outer surface of said stub shaft and said bearing cap.

4. In combination, a tank having an aperture defined in a side wall thereof, a guide or conductor roller in said tank, a stub shaft operatively connected at one end to said roller and having a recess in its other end thereof and with said other end of said stub shaft extending outwardly of said tank through said aperture, an axle fitting within said recess and having its axis generally parallel to said shaft, bearing means located within the recess and cooperating with the outer surface of the axle and the inner surface of said stub shaft within said recess, a bearing cap secured to said axle at the end remote from said recess, and sealing means disposed between the outer surface of said stub shaft and said bearing cap.

5. In combination, a tank having an aperture defined in a side wall thereof, a guide or conductor roller in said tank, a stub shaft operatively connected at one end to said roller and having a recess in its other end thereof and with said other end of said stub shaft extending outwardly of said tank through said aperture, an axle fitting within said recess and having its axis generally parallel to said shaft, bearing means located within the recess and cooperating with the outer surface of the axle and the inner surface of said stub shaft within said recess, a bearing cap secured to said axle at the end remote from said recess and firmly secured to the wall of said tank, and sealing means disposed between the outer surface of said stub shaft and said bearing cap.

6. A bearing assembly as claimed in claim 5 including a Cardan joint operatively connecting said stub shaft to said roller, said joint comprising a fork-like element secured to the roller, a recess in the inner end face of the stub shaft and a diametrically directed element in said recess, the joint being effected by the interengagement of the fork-like member and said element.

7. A bearing assembly as claimed in claim 5 in which said means for effecting a seal between the bearing cap and the stub shaft includes at least one resilient sealing ring abutting, on its inner or sealing edge, said shaft and on the outer edge the inner surface of the cap.

8. A bearing assembly as claimed in claim 7 which includes a shoulder on the inner surface of the cap thereby preventing axial movement of said sealing ring outwardly away from said roller, said sealing ring being prevented from axially moving in the opposite direction by the outer wall of said tank in the vicinity of said aperture.

9. A bearing assembly as claimed in claim 7 including means whereby liquid penetrating the region of the bearing may be drained, said means including a drain opening in the bearing cap, said opening being located in the lower part of such cap.

10. A bearing assembly as claimed in claim 9, including a through hole axially of the stub axle whereby lubricant may be applied to the region of the bearing.

11. A bearing assembly as claimed in claim 10 including a nipple whereby the outer end of said through hole may be closed.

12. In combination, a tank having an aperture defined in a side wall thereof, a guide or conductor roller in said tank, a stub shaft operatively connected at one end to said roller and having its other end extending outwardly through said aperture in said tank, a recess in said other end face of said stub shaft, a stub axle extending into the interior of said recess, bearing means between the outer surface of said stub axle and the inner surface of said stub shaft within said recess, a bearing cap disposed about the stub shaft and supporting said stub axle, a bearing holder ring encircling said bearing cap and secured to the wall of the tank, and a Cardan joint between said bearing cap and said bearing holder ring.

13. A bearing assembly as claimed in claim 12, said Cardan joint including co-operating male and female members one of which is on the outer surface of said cap and the other of which is on the inner surface of said bearing holder ring, said male and female members being diametrically disposed with respect to the axis of said stub shaft and with said female member being larger than said male member, whereby the extent of movement of the Cardan joint is limited.

14. A bearing assembly as claimed in claim 12 including a flexible sealing member between the bearing cap and the wall of the tank.

15. A bearing assembly as claimed in claim 14 including a through hole axially of the stub axle whereby lubricant may be applied to the region of the bearing.

16. A bearing assembly as claimed in claim 15 including a grease nipple whereby the outer end of the through hole may be closed.

17. In combination, a tank having an aperture defined in a side wall thereof, a guide or conductor roller in said tank, a stub shaft rigidly secured at one end thereof to said roller and having its other end extending outwardly of said tank through said aperture, a recess in the end face of said other end of said stub shaft, a stub axle extending into the interior of said recess, bearing means between the outer surface of said stub axle and the inner surface of the stub shaft, a bearing cap disposed about the stub shaft and being operatively connected to said stub axle, a bearing holder ring substantially encircling said bearing cap and secured to the wall of the tank, a flexible seal between the bearing cap and the tank wall, a Cardan joint between said cap and said ring, sealing means between said stub shaft and the cap, and outlet means communicating between the inner and outer walls of said cap and positioned in the bottom thereof, whereby liquid leaking into the region of the bearing may be removed.

18. A bearing assembly as claimed in claim 17, in which the sealing means comprises a plurality of resilient rings abutting, at their inner edges the stub shaft and, at their outer edges, the inner surface of the bearing cap, a shoulder formed on the inner surface of the cap ensuring axial positioning of the rings between said shoulder and the outer wall of said tank in the region surrounding said aperture.

19. A bearing assembly as claimed in claim 18 including a seal between the bearing holder ring and the wall of the tank.

20. A bearing assembly as claimed in claim 17 including means connected to said bearing cap whereby lubricant may be applied to the region of the seals.

References Cited in the file of this patent
UNITED STATES PATENTS
2,539,866    Schill _____ Jan. 30, 1961